(12) United States Patent
Shi et al.

(10) Patent No.: US 7,110,469 B2
(45) Date of Patent: Sep. 19, 2006

(54) SELF-CALIBRATING DIRECT CONVERSION TRANSMITTER

(75) Inventors: Hong Shi, Redondo Beach, CA (US); Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 754 days.

(21) Appl. No.: 10/094,587

(22) Filed: Mar. 8, 2002

(65) Prior Publication Data

US 2003/0169827 A1    Sep. 11, 2003

(51) Int. Cl.
*H04L 27/04* (2006.01)

(52) U.S. Cl. .............. 375/295; 375/296; 375/224; 455/126; 244/118

(58) Field of Classification Search .......... 375/295, 375/296, 224; 455/126; 244/118
See application file for complete search history.

(56) References Cited

U.S. PATENT DOCUMENTS 5,995,541 A * 11/1999 Navid et al. ............ 375/224
6,819,910 B1 * 11/2004 Shi et al. ............... 455/126
2003/0071110 A1 * 4/2003 Hilbert ................. 244/118.1
2003/0095607 A1 * 5/2003 Huang et al. ............ 375/296

* cited by examiner

*Primary Examiner*—Chieh M. Fan
*Assistant Examiner*—Eva Zheng
(74) *Attorney, Agent, or Firm*—Garlick Harrison & Markison; Bruce E. Stuckman

(57) ABSTRACT

A self-calibrating transmitter includes an up-conversion mixing module, summing module, calibration determination module, and a calibration execution module. The up-conversion mixing module is operably coupled to mix an I component of a base-band signal with an I component of a local oscillation to produce a mixed I signal and is also operably coupled to mix a Q component of the base-band signal with a Q component of the local oscillation to produce a mixed Q signal. The summing module sums the mixed I signal with the mixed Q signal to produce a modulated radio frequency (RF) signal. The calibration determination module is operably coupled to produce a calibration signal, which it generates by interpreting the local oscillation and the modulated RF signal. The calibration execution module is operably coupled to calibrate the DC level of the I and/or Q component of the base-band signal, and/or the gain of the I and/or Q component of the base-band signal based on the calibration signal.

31 Claims, 12 Drawing Sheets self-calibrating transmitter 100 self-calibrating transmitter 100

DC offset test gain offset test

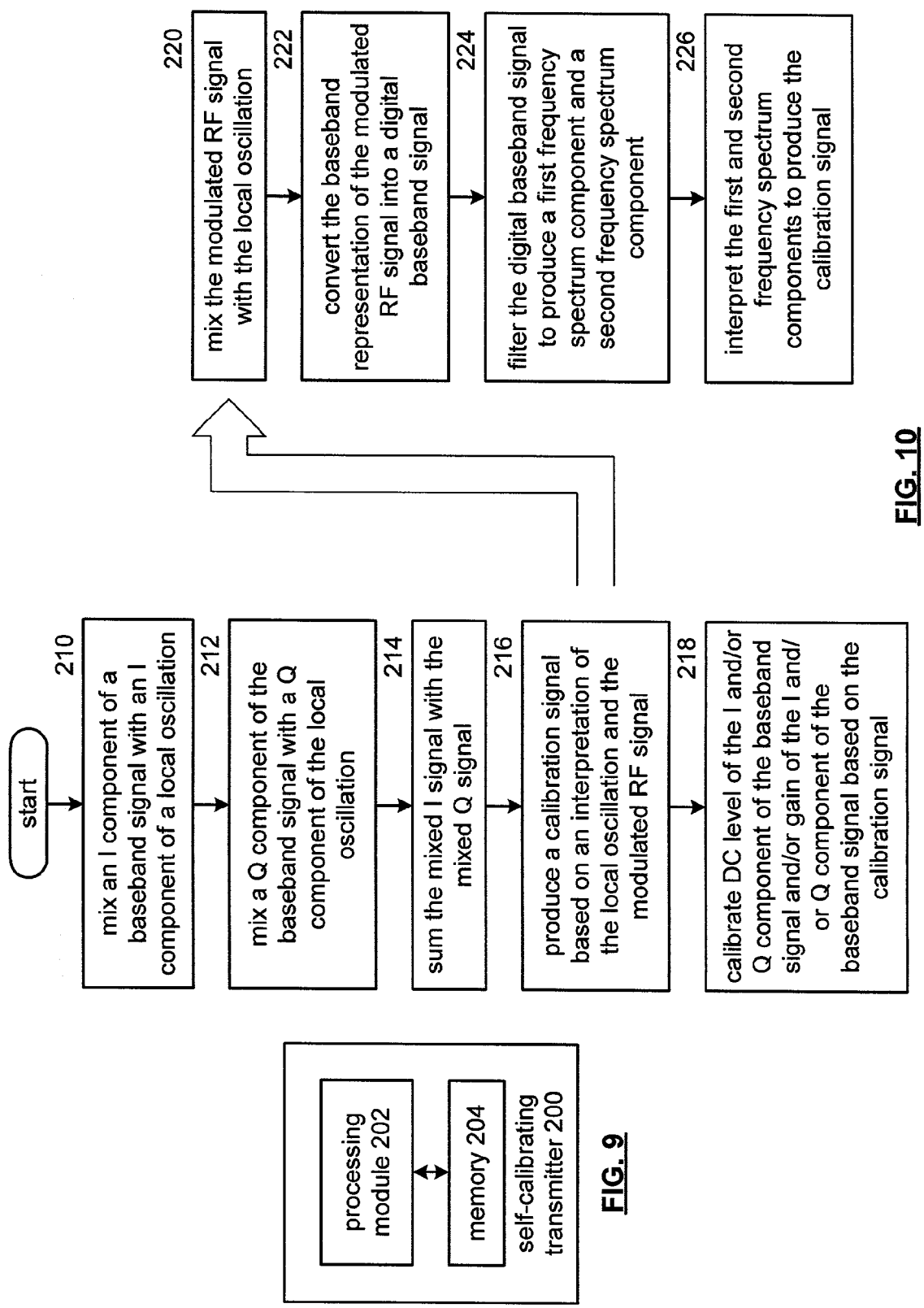

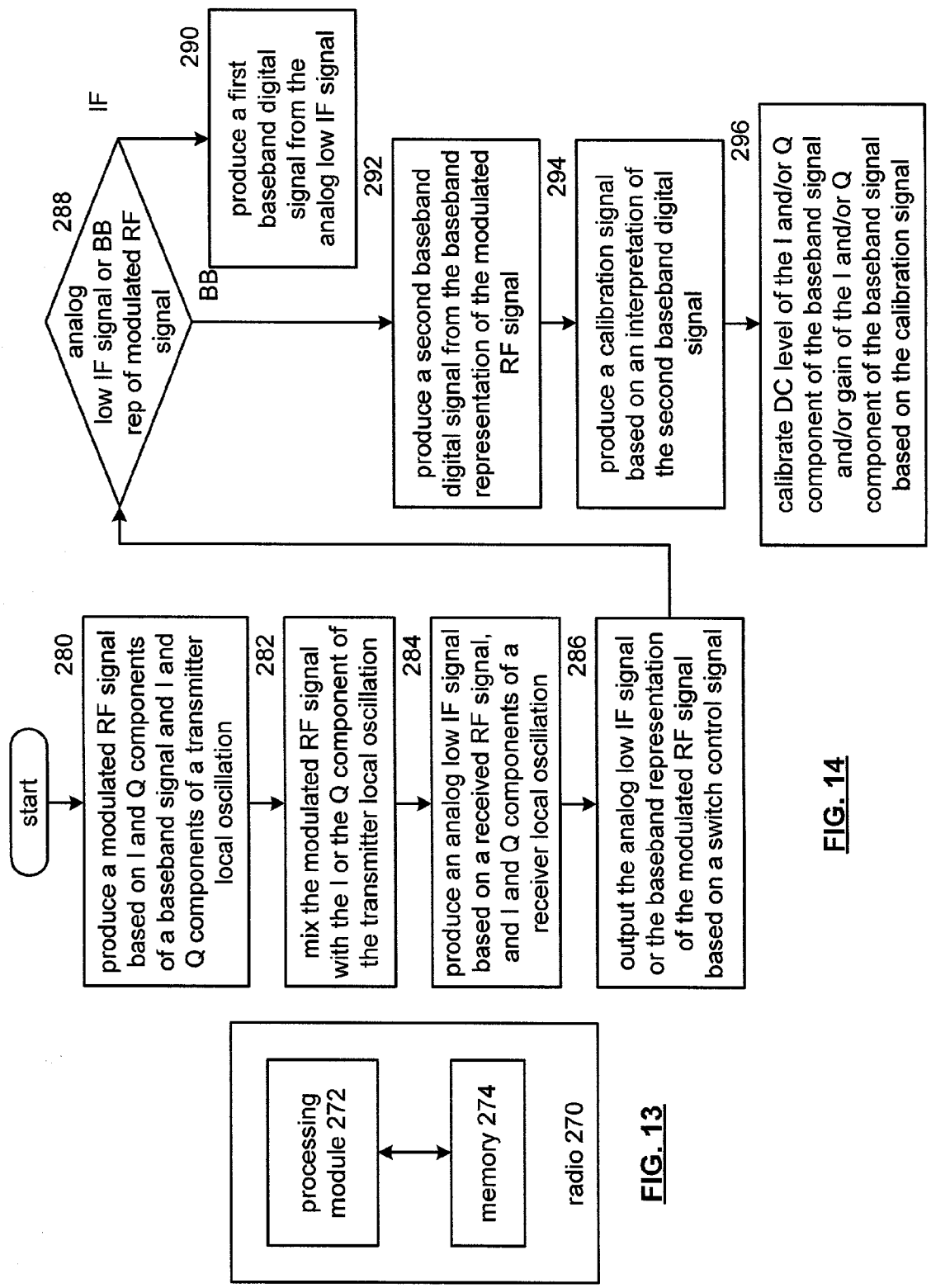

SELF-CALIBRATING DIRECT CONVERSION TRANSMITTER

TECHNICAL FIELD OF THE INVENTION

This invention relates generally to communication systems and more particularly to radio transceivers used within such communication systems.

BACKGROUND OF THE INVENTION

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channel pair (e.g., one of the plurality of radio frequency (RF) carriers of the wireless communication system) and communicate over that channel or channel pair. For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver receives RF signals, removes the RF carrier frequency from the RF signals directly or via one or more intermediate frequency stages, and demodulates the signals in accordance with a particular wireless communication standard to recapture the transmitted data. The transmitter converts data into RF signals by modulating the data to RF carrier in accordance with the particular wireless communication standard and directly or in one or more intermediate frequency stages to produce the RF signals.

As the demand for enhanced performance (e.g., reduced interference and/or noise, image rejection, compliance with multiple standards, compliance with multiple frequency bands, increased broadband applications, et cetera), smaller sizes, lower power consumption, and reduced costs increases, wireless communication device engineers are faced with a very difficult design challenge to develop such a wireless communication device. Typically, an engineer is forced to compromise one or more of these demands to adequately meet the others. For instance, an engineer may choose a direct conversion topology (i.e., convert directly from an RF signal to a base-band signal or directly from a base-band signal to an RF signal) to meet size, cost and low power requirements. However, for a direct conversion transmitter, LO pulling, RF carrier leakage due to I-Q DC offset, and I-Q gain/phase imbalance problems are more pronounced than in multistage up conversion transmitters.

As is known, local oscillation leakage results from I-Q DC offset and imperfections of the mixers within a transmitter that allow the local oscillation, which equals the RF, to be present in the resultant RF signal. The local oscillation leakage can be minimized by using multiple IF stages within the transmitter. In such an implementation, each IF stage uses a local oscillation that has a significantly different frequency than the RF, with the sum of the multiple local oscillations equals the RF. Since each local oscillation has a significantly different frequency than the RF, each local oscillation is outside the RF band of interest (i.e., the frequency spectrum of the resulting RF signal). But this requires an abandoning of the direct conversion topology and its benefits with respect to size reduction, power consumption reduction, reduced costs, and reduced complexity for broadband applications.

Therefore, a need exists for a low power, reduced size, reduced cost, and enhanced performance radio, radio transmitter, radio receiver, and/or components thereof.

SUMMARY OF THE INVENTION

These needs and others are substantially met by the self-calibrating direct conversion transmitter and applications thereof disclosed herein. A self-calibrating transmitter includes an up-conversion mixing module, summing module, calibration determination module, and a calibration execution module. The up-conversion mixing module is operably coupled to mix an I component of a base-band signal with an I component of a local oscillation to produce a mixed I signal and is also operably coupled to mix a Q component of the base-band signal with a Q component of the local oscillation to produce a mixed Q signal. The summing module sums the mixed I signal with the mixed Q signal to produce a modulated radio frequency (RF) signal.

The calibration determination module is operably coupled to produce a calibration signal, which it generates by interpreting the local oscillation and the modulated RF signal. For example, the calibration determination module may mix the local oscillation with the modulated RF frequency to produce a base-band representation of the modulated RF signal. The baseband representation of the modulated RF signal would then be converted into a digital signal, filtered and then interpreted to determine a $1^{st}$ and $2^{nd}$ frequency spectrum components. The $1^{st}$ and $2^{nd}$ frequency spectrum components indicate DC offsets that produce local oscillation leakage and/or gained imbalances within the transmitter.

The calibration execution module is operably coupled to calibrate the DC level of the I and/or Q component of the base-band signal, and/or the gain of the I and/or Q component of the base-band signal based on the calibration signal. By calibrating the DC offset level and/or the gain of the transmitter, the adverse affects of imbalances within the transmitter are reduced. As such, local oscillation leakage, gain imbalances, non-linearities, et cetera of the transmitter are improved.

BRIEF DESCRIPTION OF THE DRAWINGS

FIG. 9 illustrates a schematic block diagram of an alternate self-calibrating transmitter in accordance with the present invention;

FIG. 10 illustrates a logic diagram of a method for self-calibrating a transmitter in accordance with the present invention;

FIG. 13 illustrates a schematic block diagram of an alternate radio in accordance with the present invention; and FIG. 14 illustrates a logic diagram for transceiving signals utilizing a self-calibrating transmitter in accordance with the present invention.

DETAILED DESCRIPTION OF A PREFERRED EMBODIMENT

Figure 1:
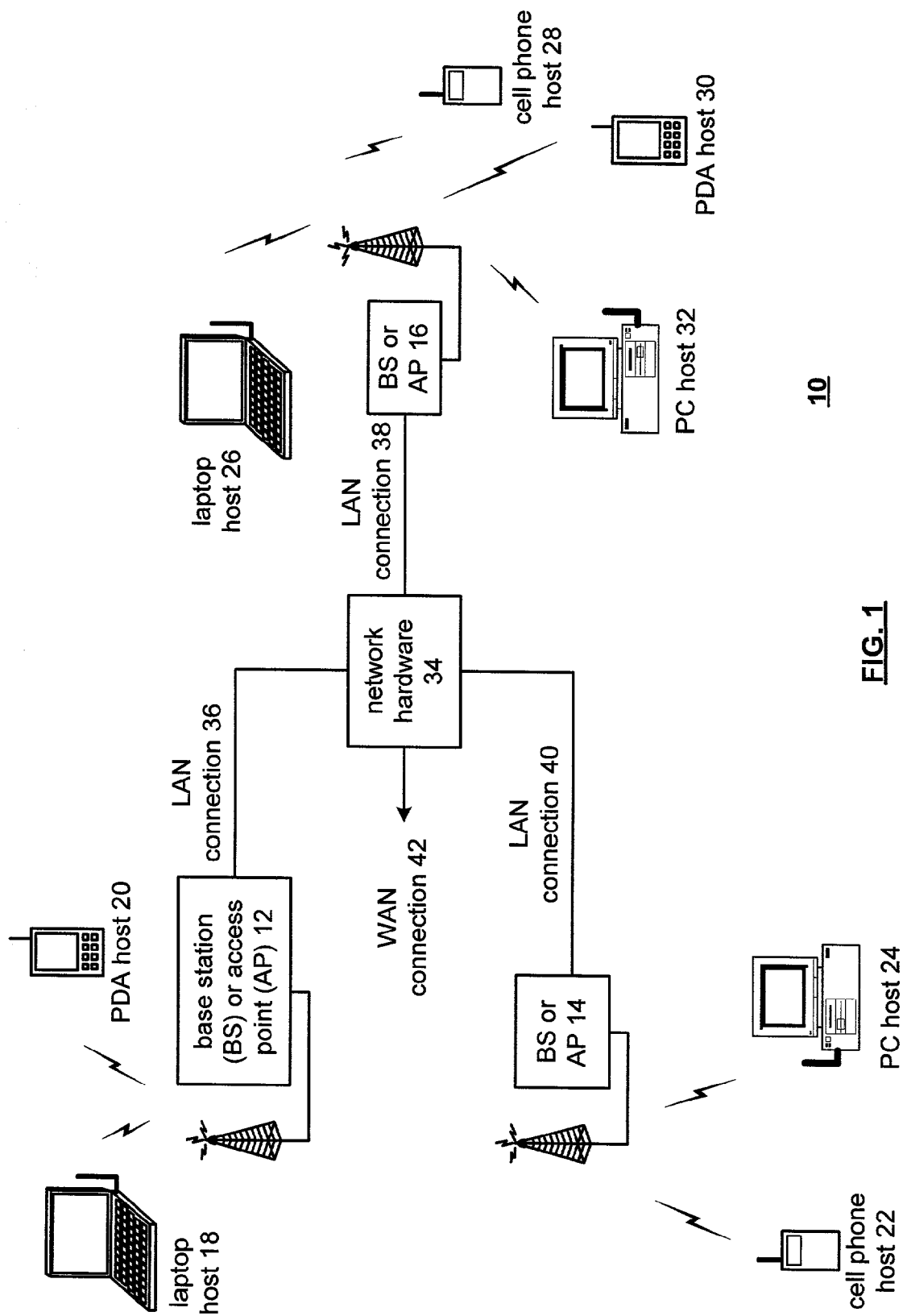
FIG. 1 illustrates a schematic block diagram of a communication system that includes wireless communication devices in accordance with the present invention.

FIG. 1 illustrates a schematic block diagram of a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a self-calibrating transmitter as disclosed herein to enhance performance for a direct conversion transmitter that has characteristics of reduced costs, reduced size, etc.

Figure 2:
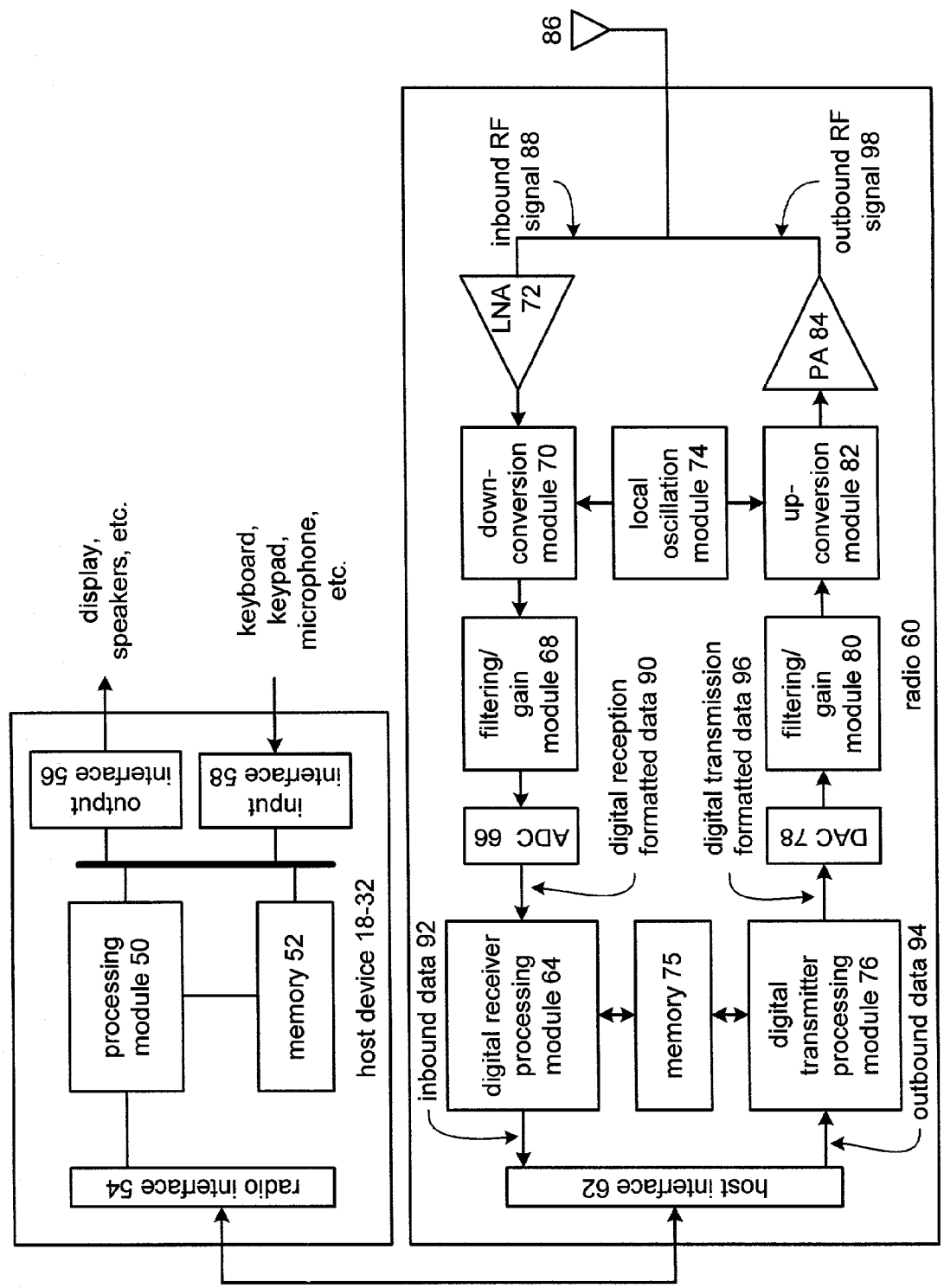
FIG. 2 illustrates a schematic block diagram of a wireless communication device in accordance with the present invention.

FIG. 2 illustrates a schematic block diagram of a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides outbound data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a receiver section, a transmitter section, local oscillation module 74, and an antenna 86. The receiver section includes a digital receiver processing module 64, analog-to-digital converter 66, filtering/gain module 68, down conversion module 70, low noise amplifier 72, and at least a portion of memory 75. The transmitter section includes a digital transmitter processing module 76, digital-to-analog converter 78, filtering/gain module 80, up-conversion module 82, power amplifier 84, and at least a portion of memory 75. The antenna 86 may be a single antenna that is shared by the transmit and receive paths or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the processing module 64 and/or 76 executes, operational instructions corresponding to at least some of the functions illustrated in FIGS. 3–14.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE802.11a, IEEE802.11b, Bluetooth, et cetera) to produce digital transmission formatted data 96. The digital transmission formatted data 96 will be a digital base-band signal or a digital low IF signal, where the low IF will be in the frequency range of zero to a few megahertz.

The digital-to-analog converter 78 converts the digital transmission formatted data 96 from the digital domain to the analog domain. The filtering/gain module 80 filters and/or adjusts the gain of the analog signal prior to providing it to the up-conversion module 82. The up-conversion module 82 directly converts the analog baseband or low IF signal into an RF signal based on a transmitter local oscillation provided by local oscillation module 74. The power amplifier 84 amplifies the RF signal to produce outbound RF signal 98. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the low noise amplifier 72, which amplifies the signal 88 to produce an amplified inbound RF signal. The low noise amplifier 72 provide the amplified inbound RF signal to the down conversion module 70, which directly converts the amplified inbound RF signal into an inbound low IF signal based on a receiver local oscillation provided by local oscillation module 74. The down conversion module 70 provides the inbound low IF signal to the filtering/gain module 68, which filters and/or adjusts the gain of the signal before providing it to the analog to digital converter 66.

The analog-to-digital converter 66 converts the filtered inbound low IF signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

As one of average skill in the art will appreciate, the radio may be implemented a variety of ways to receive RF signals and to transmit RF signals. Regardless of how the radio is implemented, the concepts of the present invention are applicable.

Figure 3:
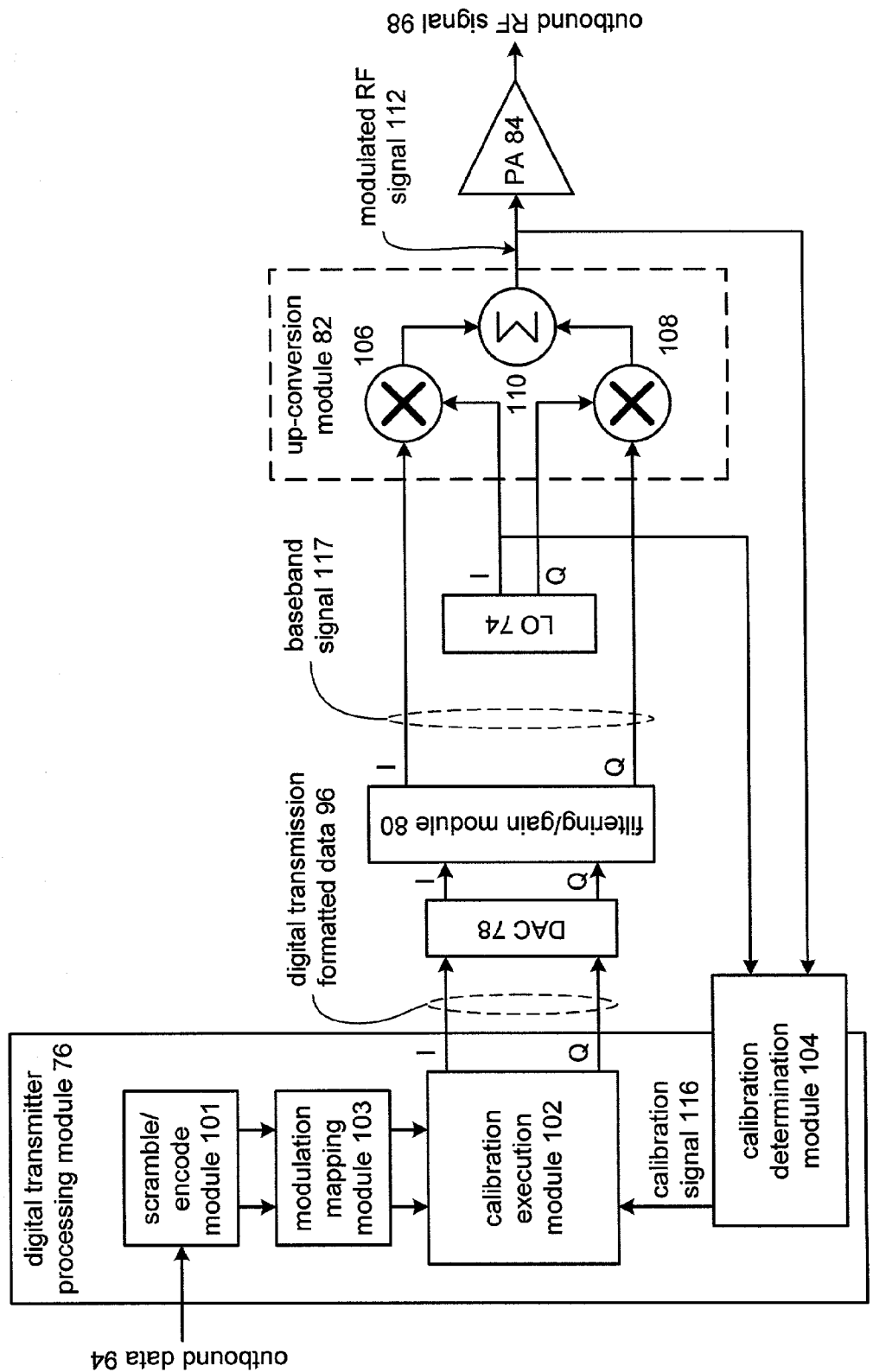
FIG. 3 illustrates a schematic block diagram of a self-calibrating transmitter in accordance with the present invention.

FIG. 3 illustrates a schematic block diagram a self-calibrating transmitter 100 that may be incorporated into radio 60. The self-calibrating transmitter 100 includes the digital transmitter processing module 76, the digital-to-analog converter 78, the filtering/gain module 80, the up-conversion module 82 and the power amplifier 84. In an IEEE 802.11a compliant embodiment, the digital transmitter processing module 76 is configured to produce a scramble and/or encode module 101, and a modulation mapping module 103. For any embodiment of the self-calibrating transmitter (i.e., transmitter embodiments that are compliant with various ones of the plurality of wireless communication standards) is further configured to include a calibration execution module 102 and a portion of the calibration determination module 104. The up-conversion module 82 includes a $1^{st}$ mixer 106, a $2^{nd}$ mixer 108 and a summing module 110.

To implement the self-calibrating function, the self-calibrating transmitter 100 places itself in a calibration mode. During calibration mode, the digital transmitter processing module 76 receives a square-wave signal as the outbound data 94. The scramble/encode module 101 of the digital processing module 76 scrambles and/or encodes the square-wave signal and provides the scrambled and/or encoded signal to the modulation mapping module 103. The modulation mapping module 103 maps the scrambled and/or encoded signal to a constellation symbol, which includes an I component and a Q component. In the illustration of FIG. 3, the constellation symbol is designated as the digital transmission formatted data 96.

The digital-to-analog converter 78 converts the I and Q components of the digital transmission formatted data 96 (i.e., the encoded and constellation mapped calibration signal) into an analog I component of the calibration signal and an analog Q component of the calibration signal. The filtering/gain module 80 filters and/or adjusts the gain of the analog I component and/or the analog Q component of the calibration signal to produce an I component and a Q component of a baseband signal 117.

The up-conversion module 82 receives the I and Q components of the baseband signal 117 and mixes them with the I and Q components of the local oscillation 74 and sums the mixed signals to produce the modulated RF signal 112. In particular, the $1^{st}$ mixer 106 mixes an I component of the base-band signal 117 with an I component of the local oscillation 74 to produce a first mixed signal. The $2^{nd}$ mixer 108 mixes a Q component of the base-band calibration signal 117 with a Q component of the local oscillation 74 to produce a second mixed signal. Summing module 110 sums the resulting mixed signals to produce the modulated RF calibration signal 112.

The calibration determination module 104 receives the modulated RF signal 112 and the I or Q component of the local oscillation 74. Based on these inputs, the calibration determination module 104 determines DC offset within the transmitter and may further determine gain imbalances within the transmitter. In general, the calibration determination module 104 produces baseband representation of the modulated RF signal 112 from the local oscillation and the modulated RF signal 112. The calibration determination module 104 then filters the baseband representation of the modulated RF signal 112 to isolate frequency spectrum components. Next, the calibration determination module 104 interprets the frequency spectrum components with respect to anticipated frequency spectrum components that are derived based on the known input signal and an assumption that the transmitter has no DC offsets and no gain imbalances to determine DC offset and/or gain imbalances of the I and/or Q paths of the transmitter. Based on the interpretation, the calibration determination module 104 generates a calibration signal 116 to compensate for DC offsets and/or gain imbalances.

The calibration determination module 104 provides the calibration signal 116 to the calibration execution module 102, which adjusts the DC offset and/or gain of the I and/or Q component of the digital transmission formatted data 96 in accordance with the calibration signal 116. Having made this adjustment, the calibration mode may be repeated to optimize the calibration signal or concluded, returning the transmitter to normal operation. In normal operation (e.g., in compliance with IEEE 802.11a) the scramble/encoder module 101 scrambles and/or encodes the outbound data 94 received from the host device to produce encoded data. The modulation mapping module 103 maps the encoded data to constellation symbols to produce I and Q components of non-calibrated digital transmission formatted data. The calibration execution module 102 adjusts the DC offset and/or gain of the I and/or Q component of the non-calibrated digital transmission formatted data based on the calibration signal to produce the digital transmission formatted data 96. The digital-to-analog converter 78, filtering gain module 80 and up-conversion module 82 operate to produce an RF signal representing the digital transmission formatted data 96. The power amplifier 84 amplifies the RF signal to produce outbound RF signal 98.

Figure 4:
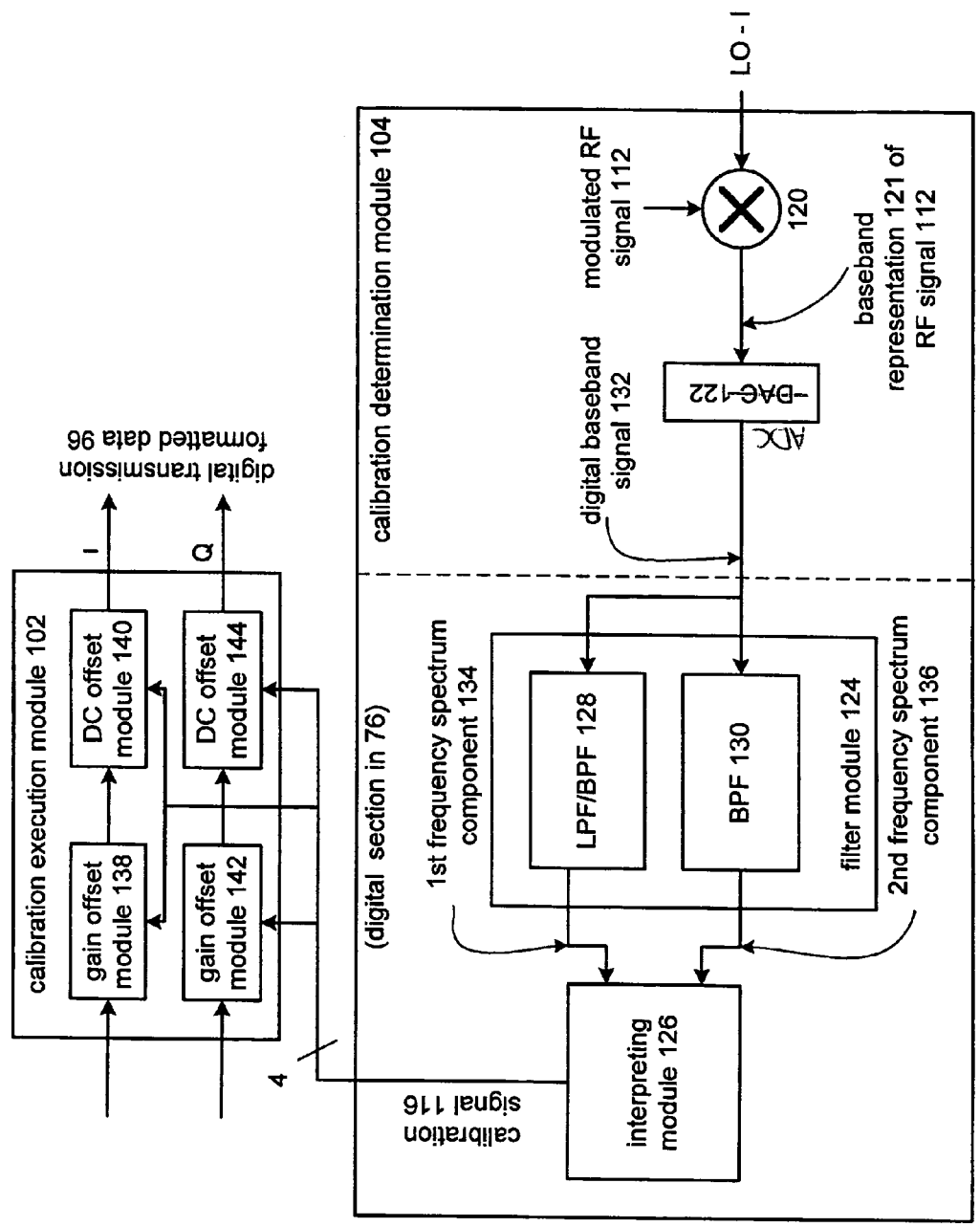
FIG. 4 illustrates a schematic block diagram of the calibration determination module and calibration execution module in accordance with the present invention.

FIG. 4 illustrates a schematic block diagram of the calibration determination module 104 and calibration execution module 102 of the self-calibrating transmitter of FIG. 3. The calibration determination module 104 includes a down-converting mixing module 120, an analog-to-digital converter 122 a filtering module 124, and an interpreting module 126. The filtering module 124 and interpreting module 126 are implemented in the digital transmitter processing module 76. As shown, the filtering module 124 may include a low-pass filter/band-pass filter 128 and a band-pass filter 130. The calibration execution module 102 includes a $1^{st}$ gain offset module 138, a $1^{st}$ DC offset module 140, a $2^{nd}$ gain offset module 142, and a $2^{nd}$ DC offset module 144.

To establish the calibration signal 116 for each of the modules 138–144 of the calibration execution module 102, the calibration determination module 104 separately calibrations the transmitter 100 for DC offset and gain imbalances. To calibration for DC offset, the filter module 124 receives coefficients for the LPF/BPF module 128 such that it functions as a low pass filter.

In DC offset calibration mode, the down-converting mixing module 120 mixes the modulated RF signal 112 with the I component of the local oscillation to produce a base-band representation 121 of the modulated RF signal 112. The analog-to-digital converter 122 converts the base-band representation 121 into a digital base-band signal 132. The low-pass/band-pass filter 128 passes a $1^{st}$ frequency spectrum component 134 of the digital baseband signal 132 (which represents the carrier leakage at DC) to the interpreting module 126. The band-pass filter 130 passes a $2^{nd}$ frequency spectrum component 136 of the digital base-band signal 132 (which represents the desired transmitted signal) to the interpreting module 126.

Figure 5:
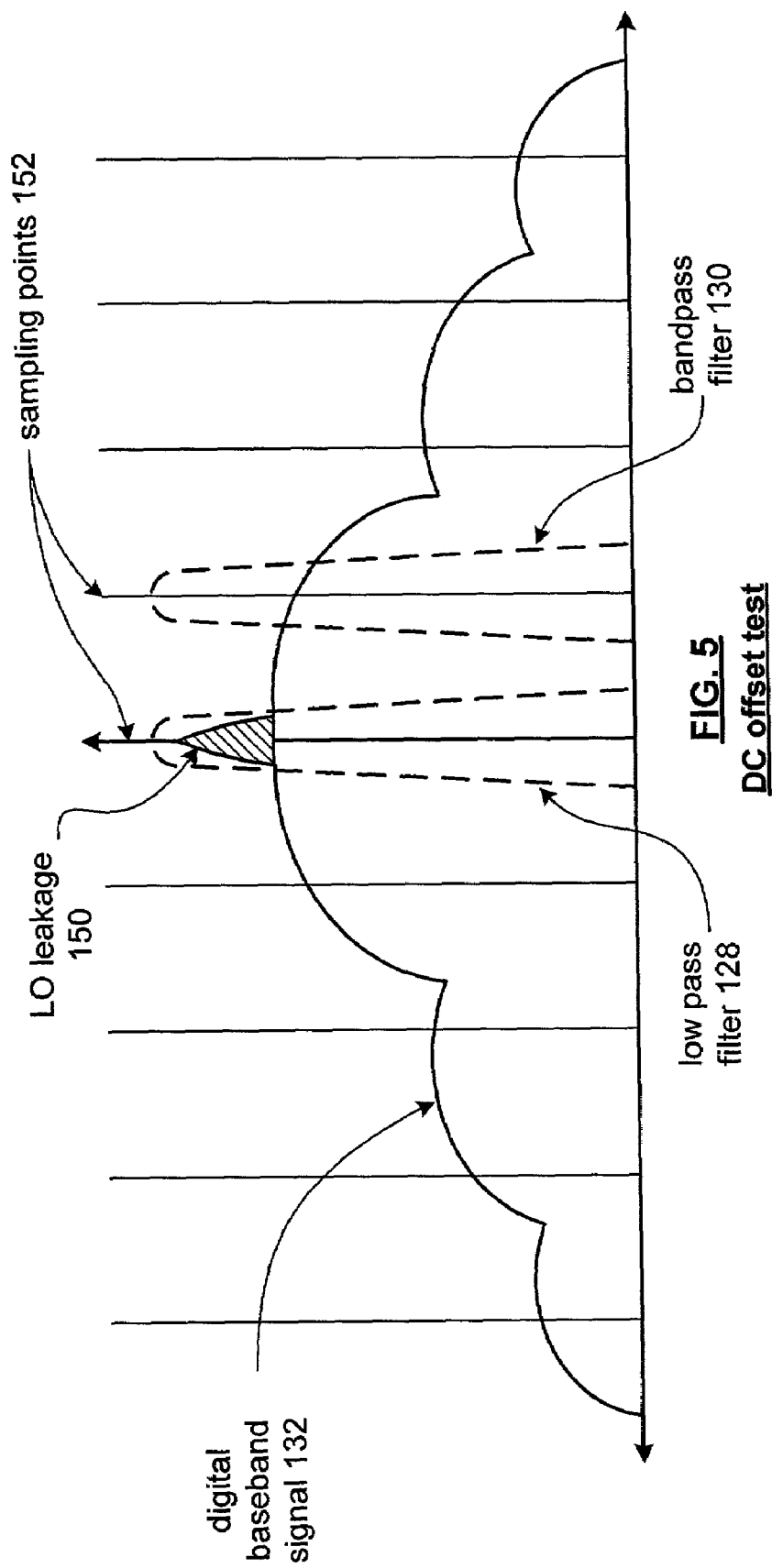
FIG. 5 illustrates a graphical representation of the frequency spectrum for a base-band representation of a modulated RF signal when performing a DC offset calibration in accordance with the present invention.

Referring simultaneously to FIGS. 4 and 5, FIG. 5 illustrates the frequency spectrum of the digital baseband signal 132, which has a sinX/X waveform, and the corresponding filtering of the filter module 124. The low pass filtering of LPF 128 isolates the transmitted signal component at DC of the digital baseband signal 132 plus any DC offset, which is represented by LO leakage 150. The bandpass filtering of BPF 130 isolates the desired transmitted signal at a known sampling frequency point.

The filtering module 124 provides the $1^{st}$ frequency spectrum component (i.e., the transmitted signal component at DC of the digital baseband signal 132 plus any DC offset) and the $2^{nd}$ frequency spectrum component (i.e., the desired transmitted signal at the known sampling point) to the interpreting module 126. The interpreting module 126 interprets the $1^{st}$ and $2^{nd}$ frequency spectrum components 134 and 136 with respect to each other and with respect to known properties of the digital baseband signal 132 (i.e., in the frequency domain it is a sinX/X waveform) to determine the LO leakage component 150.

As one of average skill in the art will appreciate, there is a variety of ways in which the interpreting module 126 may interpret the $1^{st}$ and $2^{nd}$ frequency spectrum components to produce the calibration signal. For instance, the $1^{st}$ and/or $2^{nd}$ frequency spectrum components are compared with each other. If they do not sufficient match, (e.g., the difference is less than a threshold value), the interpreting module 126 generates the calibration signal 116 to correct for DC offset.

Alternatively, the interpreting module 126 may calculate an ideal $1^{st}$ frequency spectrum component based on the $2^{nd}$ frequency spectrum component 136 and known properties of the digital baseband signal 132 (i.e., that it is a sinX/X waveform). The interpreting module 126 compares the ideal $1^{st}$ frequency spectrum component with the actual $1^{st}$ frequency spectrum component to determine the LO leakage 150. Having determined the LO leakage, the interpreting module 126 generates the calibration signal to adjust the DC level of the I and/or Q paths of the transmitter via DC offset module 140 and/or DC offset module 144, respectively.

DC offset module 140 and/or 144, which, in one embodiment, may be summing modules, receives the calibration signal 116, which represents a DC offset adjustment voltage, and either adds or subtracts the DC offset adjustment voltage to/from its corresponding input. If both DC offset modules 140 and 144 are to offset their respective inputs, the calibration signal 116 includes a DC offset adjust voltage for DC offset module 140 and another one for DC offset module 144. At this point, the process may be repeated to further optimize the calibration signal 116.

In a gain offset calibration mode, the calibration determination module 104 is determining gain imbalances between the I path and the Q path of the transmitter. To do this, a calibration signal is provided to the transmitter such that a modulated RF signal 112 is produced for the calibration signal. The down-converting mixing module 120 mixes the modulated RF calibration signal 112 with the I component of the local oscillation to produce a base-band representation 121 of the RF calibration signal 112. The digital-to-analog converter 122 converts the base-band representation 121 into a digital base-band signal 132.

Figure 6:
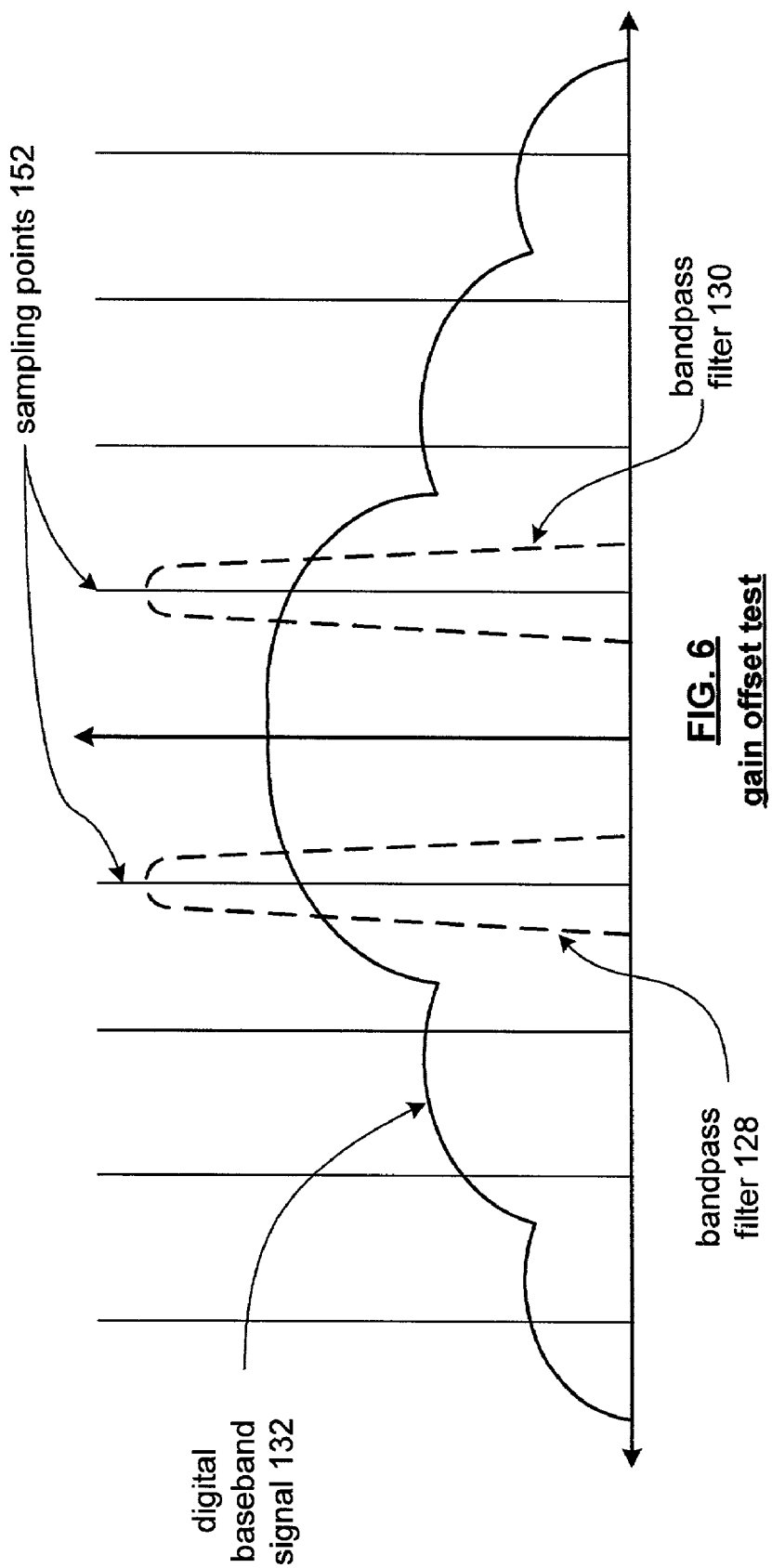
FIG. 6 illustrates a graphical representation of the frequency spectrum for a base-band representation of a modulated RF signal when performing a gain offset calibration in accordance with the present invention.

The filtering module 124 receives filtering coefficients that configure the low-pass filter/band-pass filter 128 to function as a band-pass filter centered at a particular frequency and centers the band-pass filter 130 at a complimentary frequency as shown in FIG. 6. The band-pass filter 128 filters the digital base-band signal 132 to produce a $1^{st}$ frequency spectrum component 134 while band-pass filter 130 filters the digital baseband signal 132 to produce a $2^{nd}$ frequency spectrum component 136. The interpreting module 128 interprets the $1^{st}$ and $2^{nd}$ frequency spectrum components 134 and 136 to determine an imbalance. If an imbalance exists, i.e., the magnitudes of the $1^{st}$ and $2^{nd}$ frequency spectrum components 134 and 136 do not sufficiently match (e.g., greater than a pre-stored threshold) the interpreting module 126 generates the calibration signal 116 to compensate for the imbalance.

The interpreting module 126 provides the calibration signal 116 to gain offset module 138 and/or gain offset module 142, which adjusts the gain of the I and/or Q path in accordance with the calibration signal 116. In one embodiment, the gain offset modules 138 and 142 include multipliers that multiple a gain offset value indicated by the calibration signal 116 with a corresponding input signal. As such, the calibration signal is reflective of the amount of gain offset and may be a value that is less than, equal to, or greater than one.

Figure 7:
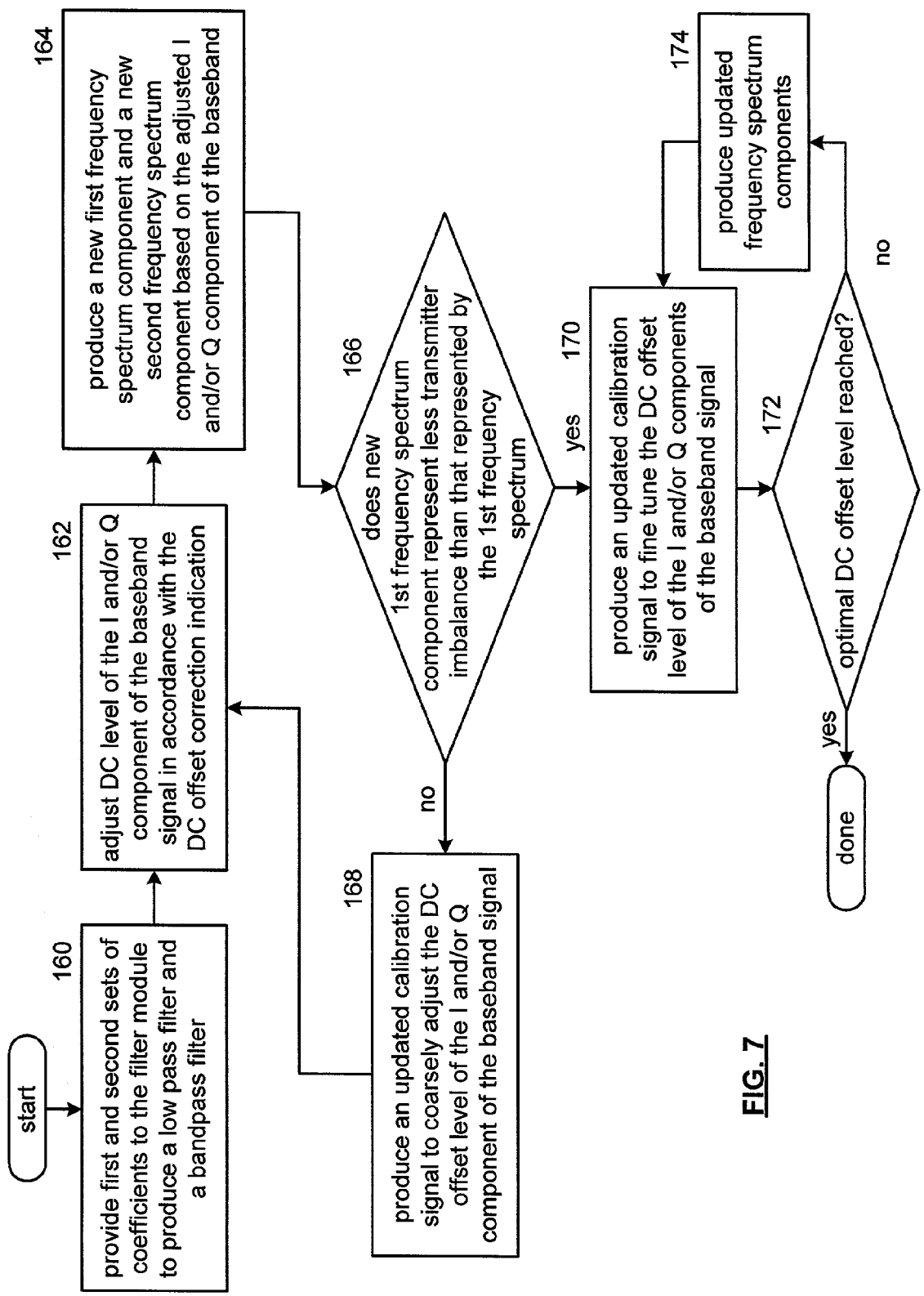
FIG. 7 illustrates a logic diagram of a method for generating a calibration signal to minimize DC offset levels within the self-calibrating transmitter in accordance with the present invention.

FIG. 7 illustrates a logic diagram of a method performed by the calibration determination module to establish the calibration signal to adjust the DC offset. The process begins at Step 160 where $1^{st}$ and $2^{nd}$ sets of coefficients are provided to the filtering module to produce a low-pass filter and a band-pass filter. The process then proceeds to Step 162 where the DC level of the I and/or Q components of the base-band signal are adjusted in accordance with the DC offset correction indication, which is indicated by the calibration signal.

The process then proceeds to Step 164 where a new $1^{st}$ frequency spectrum component and a new $2^{nd}$ frequency spectrum components are produced based on the adjusted I and/or adjusted Q components of the base-band signal. The process then proceeds to Step 168 where the calibration determination module determines whether the new $1^{st}$ frequency spectrum component represents less transmitter DC offset than that represented by the $1^{st}$ frequency spectrum. If so, the process proceeds to Step 170 where the calibration determination module produces an updated calibration signal to fine-tune the DC offset level of the I and/or Q components of the base-band signal.

Having updated the calibration signal, the calibration determination module determines whether the DC offset level has reached an optimal point. If so, the process is complete. If not, the process proceeds to Step 174 where the calibration determination module produces updated frequency spectrum components by tweaking the calibrating signal and repeating the calibration. The process then reverts to Step 170 and remains in this loop until an optimal DC offset level is reached.

If, at Step 166, the new frequency spectrum components do not represent less transmitter DC offset than the previous frequency spectrum components, the process proceeds to Step 168. At Step 168, the calibration determination module produces an updated calibration signal that coarsely adjusts the DC offset level of the I and/or Q components of the base-band signal. Having done this, the process repeats at Step 162 until an optimal DC offset level is reached. As such, the calibration determination module selects an initial set of DC offset values for the I and/or Q component. Based on this initial setting, the calibration determination module increases or decreases the corresponding DC offsets. If this produces less transmitter DC offset, the calibration determination module fine-tunes these values until an optimal DC offset is reached. If the initially adjusted values produce more transmitter DC offset, the calibration determination module makes a coarse adjustment in the opposite direction with respect to the initial settings and then repeats the calibration.

Figure 8:
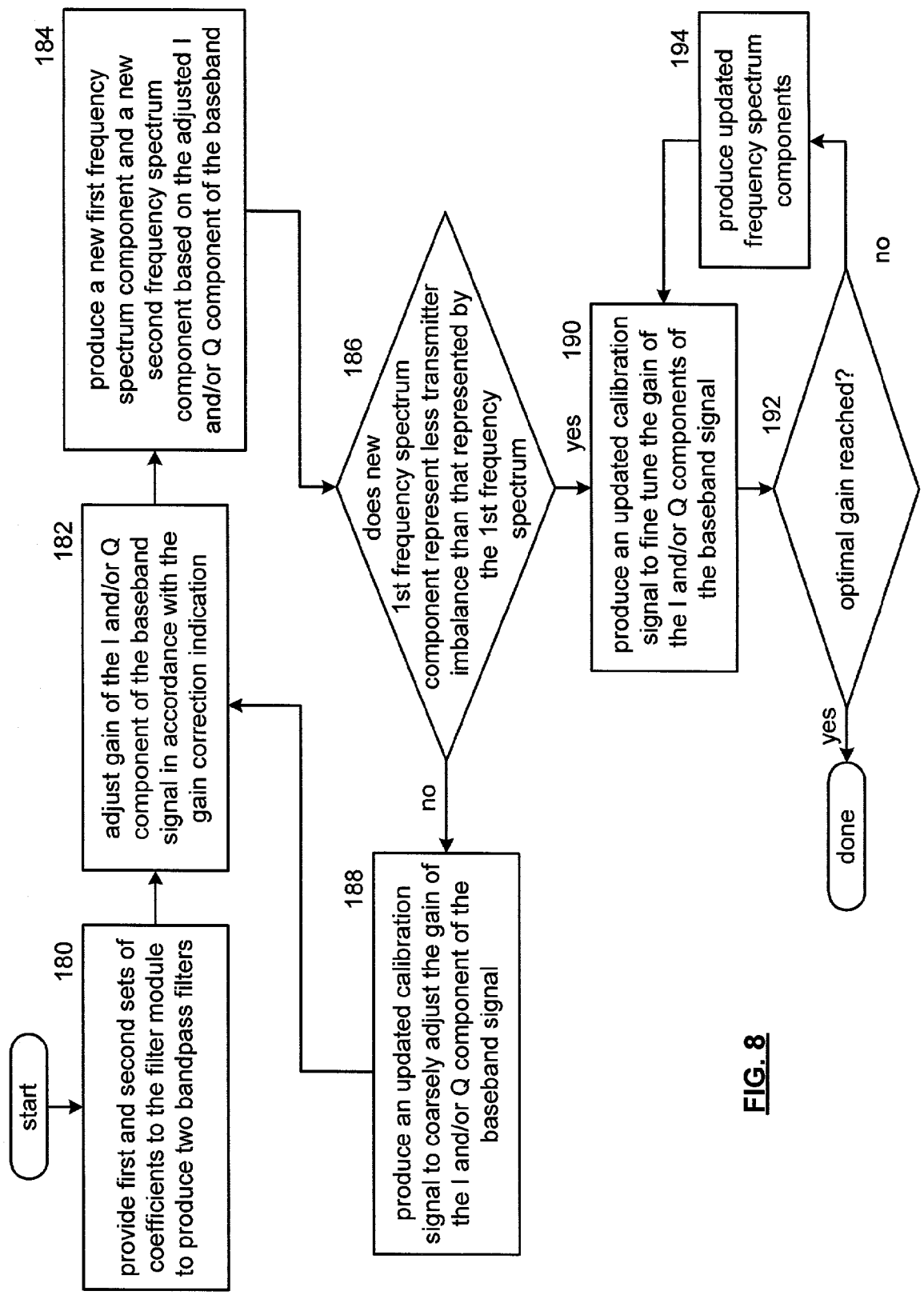
FIG. 8 illustrates a logic diagram of a method for generating a calibration signal to optimize gain within a self-calibrating transmitter in accordance with the present invention.

FIG. 8 illustrates a logic diagram that may be performed by the calibration determination module to determine the calibration signal for adjusting the gain of the I and/or Q components of the base-band signal. The process begins at Step 180 where the calibration determination module provides $1^{st}$ and $2^{nd}$ sets of coefficients to the filtering module to produce two band-pass filters. The process then proceeds to Step 182 where the calibration determination module adjusts the gain of the I and/or Q component of the base-band signal in accordance with the gain correction indication, which is indicated within the calibration signal.

The process then proceeds to Step 184 where the calibration determination module produces a new $1^{st}$ frequency spectrum component and a new $2^{nd}$ frequency spectrum component based on the adjusted I and/or Q components of the base-band signal. The process then proceeds to Step 186 where the calibration determination module determines whether the new $1^{st}$ frequency spectrum components represent less transmitter imbalance than that represented by the initial frequency spectrum. If not, the process proceeds to Step 188. At Step 188, the calibration determination module produces an updated calibration signal to coarsely adjust the gain of the I and/or Q components of the base-band signal. At this point, the process repeats at Step 182.

When the new $1^{st}$ frequency spectrum components represent less transmitter imbalance than that represented by the $1^{st}$ frequency spectrum, the process proceeds to Step 190. At Step 190, the calibration determination module produces an updated calibration signal to fine-tune the gain of the I and/or Q components of the base-band signal. The process then proceeds to Step 192 where the calibration determination module determines whether an optimal gain setting has been reached. If so, the process is complete. If not, the process proceeds to Step 194. At Step 194, the calibration determination module produces updated frequency spectrum components based on a further fine-tuning of the gain of the calibration signal. At this point, the process repeats at Step 190 until an optimal gain setting is reached.

FIG. 9 illustrates a schematic block diagram of a self-calibrating transmitter 200 and includes processing module 202 and memory 204. The processing module 202 may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 204 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 202 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 204 stores, and the processing module 202 executes, operational instructions corresponding to at least some of the steps illustrated in FIG. 10.

FIG. 10 illustrates a logic diagram of a method that may be executed by the self-calibrating transmitter 200 of FIG. 9. The process begins at Step 210 where the transmitter mixes an I component of a base-band signal with an I component of a local oscillation to produce a mixed I signal. The process then proceeds to Step 212 where the transmitter mixes a Q component of the base-band signal with a Q component of the local oscillation to produce a mixed Q signal. The process then proceeds to Step 214 where the transmitter sums the mixed I signal with the mixed Q signal to produce a modulated RF signal.

The process then proceeds to Step 216 where the transmitter produces a calibration signal based on an interpretation of the local oscillation and the modulated RF frequency. This may be done as illustrated with respect to Steps 220–226.

At Step 220, the transmitter mixes the modulated RF signal with the local oscillation to produce a base-band representation of the modulated RF signal. The process then proceeds to Step 222 where the transmitter converts the base-band representation of the modulated RF signal into a digital base-band signal. The process then proceeds to Step 224 where the transmitter filters the digital base-band signal to produce a $1^{st}$ frequency spectrum component and a $2^{nd}$ frequency spectrum component. Note that for determining DC offset, the filtering includes low pass filtering and band pass filtering and, when determining gain offset, the filtering includes complimentary band pass filtering. The process then proceeds to Step 226 where the transmitter interprets the $1^{st}$ and $2^{nd}$ frequency spectrum components to produce the calibration signal. The interpretation and subsequent generation of the calibration signal may be performed as previously illustrated and discussed with reference to FIGS. 4–6.

Returning to the main flow of the diagram, the process then proceeds to Step 218 where the transmitter calibrates the DC level of the I and/or Q components of the baseband signal and/or calibrates the gain of the I and/or Q components of the base-band signal based on the calibration signal. The corresponding calibration reduces imbalances within the transmitter thereby enhancing performance of the transmitter and radios incorporating such transmitters.

Figure 11:
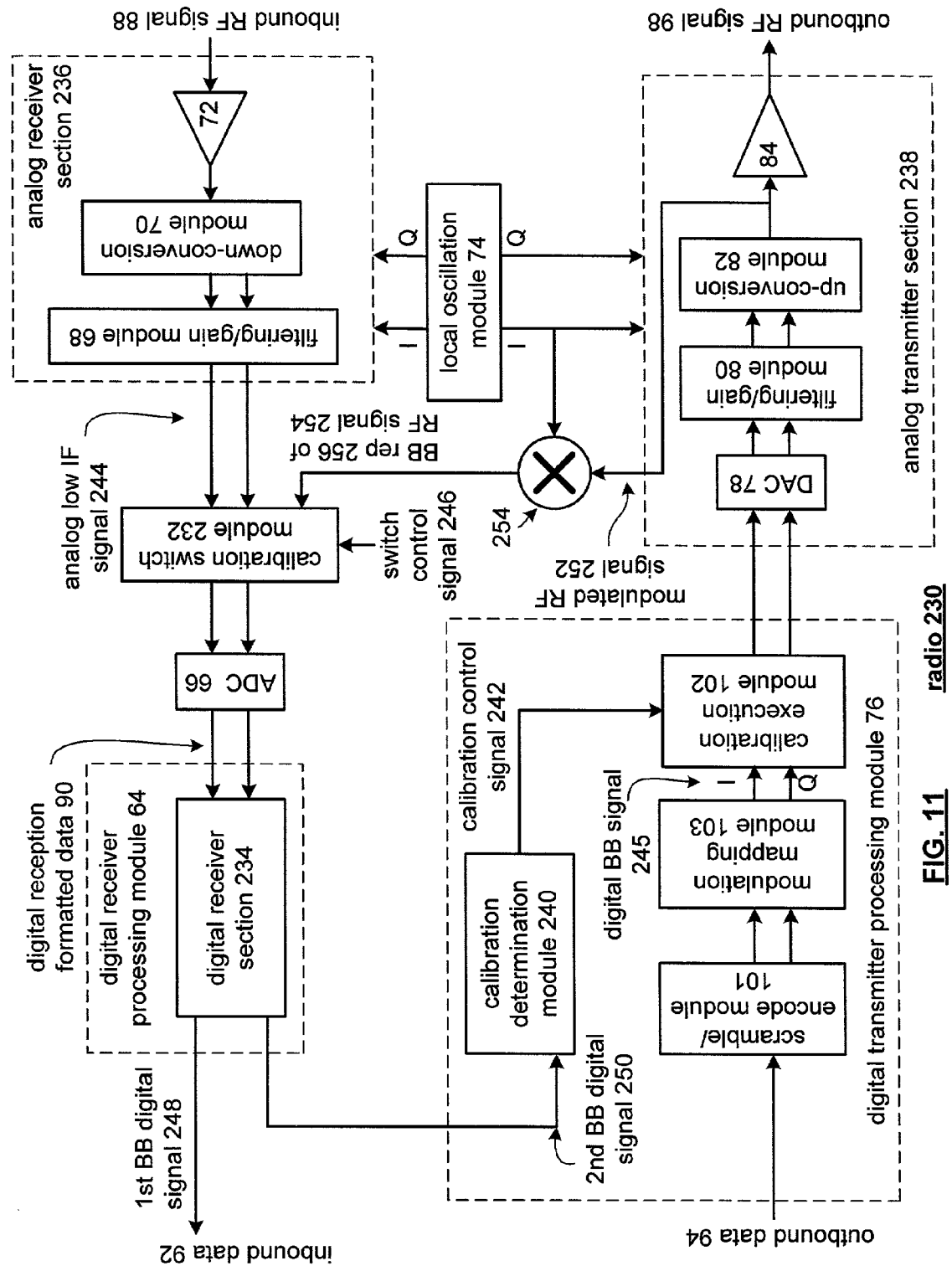
FIG. 11 illustrates an alternate schematic block diagram of a radio in accordance with the present invention.

FIG. 11 illustrates a schematic block diagram of a radio 230 that includes an analog receiver section 236, calibration switch module 232, analog-to-digital converter 66, digital receiver processing module 64, digital transmitter processing module 76, analog transmitter section 238, mixing module 254, and a local oscillation module 74. The analog receiver section 236 receives an inbound RF signal 88 via a low-noise amplifier 72. The low-noise amplifier 72 amplifies the RF signal 88 and provides the amplified signal to the down-converting module 70. The down-converting module 70 removes the RF carrier from the signal and provides the down-converted signal to filtering/gain module 68. The filtering/gain module 68 filters and/or adjusts the gain of the down-converted signal to produce an analog low IF signal 244. Note that the low IF signal may have a carrier frequency in the range of 0 Hertz to a few megahertz.

The calibration switching module 232 is operably coupled to pass either the analog low IF signal 244 or a base-band representation 256 of the RF signal 254 to the analog to digital converter 66 based on a switch control signal 246. The calibration switch module 232 will pass the analog low IF signal 244 during normal operations (i.e., when the radio 230 is receiving RF signals) and passes the base-band representation 256 of the RF signal 254 when the radio 230 is in a transmitter calibration mode.

Mixing module 254 produces the base-band representation 256 of the RF signal 254 by mixing a modulated RF signal 252, which is produced by the analog transmitter section 238, with an I or Q component of a local oscillation for the transmitter section.

The analog transmitter section 238 includes the digital to analog converter 78, the filtering/gain module 82, the up-converting module 82, and the power amplifier 84. Each of these modules 78–84 operate as previously discussed to produce the modulated RF signal 252 from a digital base-band signal, which is received from the digital transmitter processing module 76.

During normal operations, the digital transmitter processing module 76 converts outbound data 94, which is received from the host device, into digital baseband signals, which may have a carrier frequency of 0 to a few megahertz. As shown, the digital transmitter processing module 76 includes a scramble/encode module 101, modulation mapping module 103, and a calibration execution module 102. As previously discussed, the calibration execution module 102 adjusts gain and/or DC offset of an I component and/or Q component of the digital base-band signal.

Also during normal operations, the analog-to-digital converter 66 converts the analog low IF signal 244 into a digital reception formatted data 90. A digital receiver section 234 within the digital receiver processing module 64 processes, in accordance with one of a plurality of wireless communication standards, the digital reception formatted data 90 to produce a $1^{st}$ baseband digital signal 248, which is provided as inbound data 92 to the host device.

During calibration mode for DC offset, the analog-to-digital converter 66 converts the base-band representation 256 of the RF signal 254 into the digital reception formatted data 90. The digital receiver section 234 is configured to include a low pass filter and a band pass filter which filter the digital reception formatted data 90 to produce a $2^{nd}$ baseband digital signal 250. The $2^{nd}$ baseband digital signal 250 includes a $1^{st}$ frequency spectrum component and a $2^{nd}$ frequency spectrum component and is provided to the calibration determination module 240.

The calibration determination module 240 within the digital transmitter processing module 76 interprets the $1^{st}$ and $2^{nd}$ frequency spectrum components to determine the presence of a DC offset. If a DC offset is present, the calibration determination module 240 generates the calibration signal 242 to reduce and/or eliminate the DC offset.

During calibration mode for gain offset, the analog-to-digital converter 66 converts the base-band representation 256 of the RF signal 254 into the digital reception formatted data 90. The digital receiver section 234 is configured to include complimentary band pass filters that filter the digital reception formatted data 90 to produce a $2^{nd}$ base-band digital signal 250. The $2^{nd}$ baseband digital signal 250 includes a $1^{st}$ frequency spectrum component and a $2^{nd}$ frequency spectrum component and is provided to the calibration determination module 240.

The calibration determination module 240 interprets these 1$^{st}$ and 2$^{nd}$ frequency spectrum components for the presence of a gain offset, or imbalance. If a gain offset exists, the calibration determination module 240 generates the calibration signal 242 to reduce and/or eliminate the gain offset.

The calibration determination module 240 provides the calibration control signal 242 to the calibration execution module 102, which adjusts gain and/or DC offset of an I and Q component of the base-band digital signal 245 based on the calibration control signal 242. Accordingly, the self-calibrating transmitter of FIG. 11 is capable of self correcting DC offsets, which produces local oscillation leakage if not corrected, and is capable of self correcting gain imbalances, which causes transmission errors, increased power consumption, etc. if not corrected.

Figure 12:
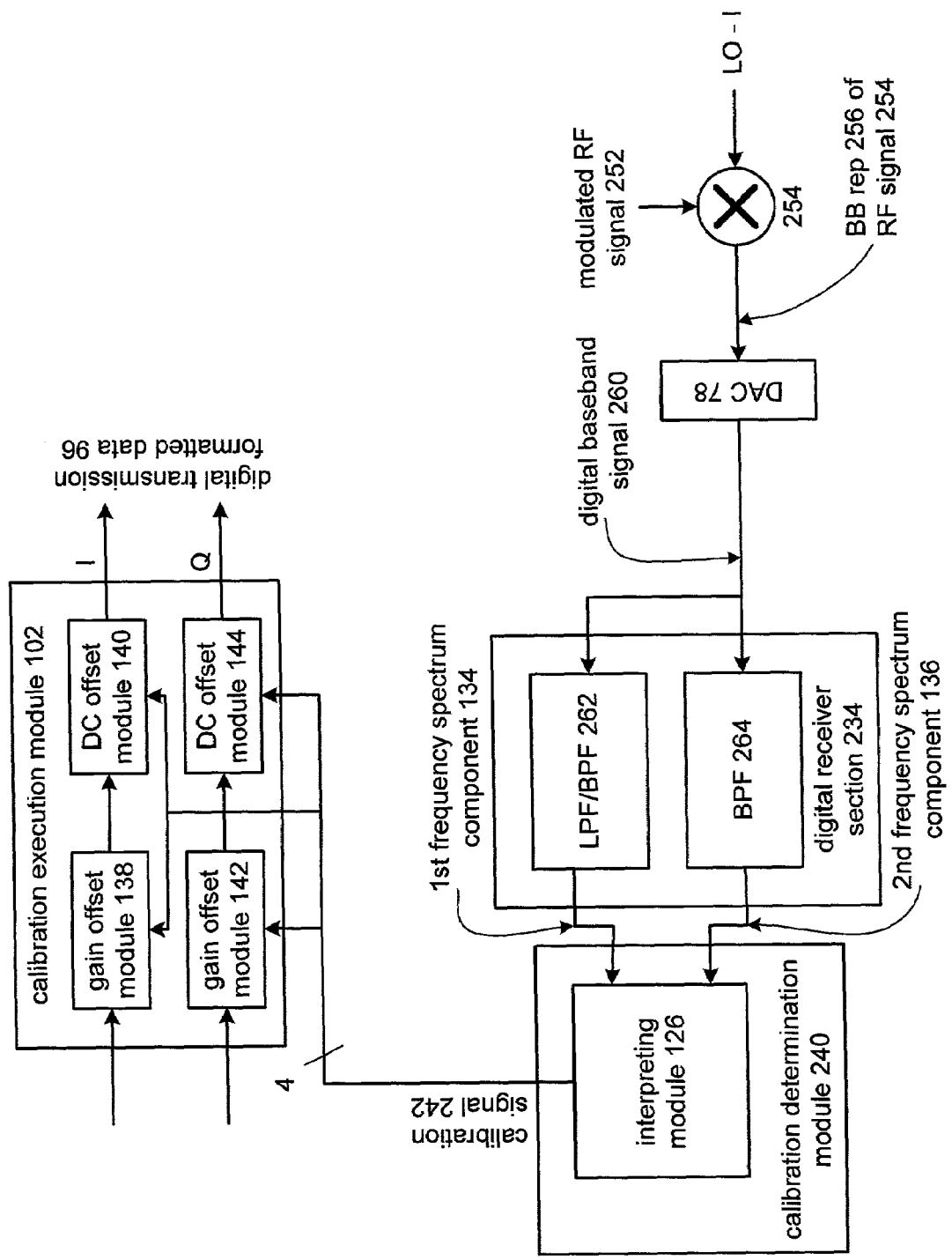
FIG. 12 illustrates a schematic block diagram of calibration circuitry within the radio of FIG. 11.

FIG. 12 illustrates a more detailed schematic block diagram of the calibration circuitry of radio 230. As illustrated, the calibration circuitry includes mixing module 254, digital-to-analog converter 78, the digital receiver section 234, the calibration determination module 240 and the calibration execution module 102. The digital receiver section 234 includes a low-pass/band-pass filter 262 and a band-pass filter 264. The calibration determining module 240 includes the interpreting module 126. The calibration execution module 102 includes the gain offset module 138, DC offset module 140, gain offset module 142 and DC offset module 144. As configured, the components perform similarly to the circuitry illustrated and discussed with reference to FIGS. 4–6 to produce the calibration signal 242. In this embodiment, however, the calibration circuitry is taking advantage of portions of the receiver to facilitate the self calibration of the transmitter section.

FIG. 13 illustrates a schematic block diagram of radio 270 that includes processing module 272 and memory 274. The processing module 272 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 274 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 272 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 274 stores, and the processing module 272 executes, operational instructions corresponding to at least some of the steps illustrated in FIG. 14.

FIG. 14 illustrates a logic diagram of a method for self calibrating a transmitter within the radio 270. The process begins at Step 280 where the radio produces a modulated RF signal based on I and Q components of a base-band signal and I and Q components of a transmitter local oscillation. The process then proceeds to Step 282 where the radio mixes the modulated RF signal with the I or Q component of the transmitter local oscillation to produce a base-band representation of the modulated RF signal.

The process then proceeds to Step 284 where the radio produces an analog low IF signal based on a received RF signal and I and Q components of a received local oscillation. The process then proceeds to Step 286 where the radio outputs the analog low IF signal or base-band representation of the modulated RF signal based on a switch control signal. The switch control signal will enable the outputting of the analog low IF signal during normal mode and the outputting of the base-band representation of the modulated RF signal during transmitter calibration mode.

The process then proceeds to Step 288 where a determination is made as to whether the analog low IF signal or base-band representation of the RF signal is being outputted. When the low IF signal is being outputted, the process proceeds to Step 290 where the radio 270 produces a 1$^{st}$ base-band digital signal from the analog low IF signal, which is subsequently provided to the host device as inbound data.

If the base-band representation of the RF signal is being outputted, the process proceeds to Step 292 where the radio produces a 2$^{nd}$ base-band digital signal from the base-band representation of the modulated RF signal. The process then proceeds to Step 294 where the radio produces a calibration signal based on an interpretation of the 2$^{nd}$ base-band digital signal. This may be done as previously described with reference to FIGS. 11 and 12. The process then proceeds to Step 296 where the radio calibrates the DC level of the I and/or Q components of the base-band signal and/or calibrates the gain of the I and/or Q components of the base-band signal based on the calibration signal.

The preceding discussion has presented a self-calibrating transmitter that corrects for imbalances within the transmitter that, if uncorrected, would adversely affect the operation of the transmitter by producing local oscillation leakage, gain imbalances, et cetera. By calibrating for these imbalances within the transmitter, a direct conversion transmitter may be implemented as an integrated circuit and yield high performances. As one of average skill in the art will appreciate, other embodiments may be derived from the teaching of the present invention, without deviating from the scope of the claims.

What is claimed is:
1. A self-calibrating direct conversion transmitter, wherein the transmitter comprises:
   up-conversion mixing module that mixes an I component of a baseband signal with an I component of a local oscillation to produce a mixed I signal and mixes a Q component of the baseband signal with a Q component of the local oscillation to produce a mixed Q signal;
   summing module that sums the mixed I signal with the mixed Q signal to produce a modulated radio frequency (RF) signal;
   calibration determination module operably coupled to produce a calibration signal based on an interpretation of the local oscillation and the modulated RF signal; and
   calibration execution module operably coupled to calibrate at least one of: DC level of the I component of the baseband signal, DC level of the Q component of the baseband signal, gain of the I component of the baseband signal, and gain of the Q component of the baseband signal based on the calibration signal such that the imbalance within the transmitter is reduced, wherein the calibration execution module further comprises:

an I component DC offset module operably coupled to adjust DC level of the I component of the baseband signal based on the calibration signal;

an I component gain offset module operably coupled to adjust gain of the I component of the baseband signal based on the calibration signal;

a Q component DC offset module operably coupled to adjust DC level of the Q component of the baseband signal based on the calibration signal; and a Q component gain offset module operably coupled to adjust gain of the Q component of the baseband signal based on the calibration signal.

2. The transmitter of claim 1 further comprises:
power amplifier driver operably coupled to increase power level of the modulated RF signal.

3. The transmitter of claim 1, wherein the calibration determination module further comprises:
down-converting mixing module operably coupled to mix the modulated RF signal with the local oscillation to produce a baseband representation of the modulated RF signal;
analog to digital converter operably coupled to convert the baseband representation of the modulated RF signal into a digital baseband signal;
filter module operably coupled to filter the digital baseband signal to produce a first frequency spectrum component and a second frequency spectrum component; and
interpreting module operably coupled to interpret the first and second frequency spectrum components to produce the calibration signal.

4. The transmitter of claim 3, wherein the filter module further comprises:
low pass filter operably coupled to pass a local oscillator leakage component of the digital baseband signal as the first frequency spectrum component; and
bandpass filter operably coupled to pass a signal component of the digital baseband signal as the second frequency spectrum component, wherein the calibration signal represents a DC offset correction indication.

5. The transmitter of claim 4, wherein the calibration determination module and calibration execution module further comprise:
processing module; and
memory operably coupled to the processing module, wherein the memory stores operational instructions that cause the processing module to:
adjusting DC level of the I component of the baseband signal in accordance with the DC offset correction indication;
producing a new first frequency spectrum component and a new second frequency spectrum component based on filtering a new digital baseband signal that represents a mixed resultant of the local oscillation with the modulated RF signal after the DC level of the I component of the baseband signal was adjusted;
determining whether the new first frequency spectrum component represents less transmitter imbalance than that represented by the first frequency spectrum;
when the new first frequency spectrum component represents less transmitter imbalance, producing at least one updated calibration signal to fine tune the DC offset level of the I component of the baseband signal to substantially optimize the transmitter imbalance; and
when the new first frequency spectrum component does not represent less transmitter imbalance, producing at least one updated calibration signal to coarsely adjust the DC offset level of the I component of the baseband signal.

6. The transmitter of claim 5, wherein the memory further comprises, operational instructions that cause the processing module to:
provide a first set of coefficients to the filter module such that a portion of the filter module forms the low pass filter; and
provide a second set of coefficients to the filter module such that another portion of the filter module forms the bandpass filter.

7. The transmitter of claim 4, wherein the calibration determination module and calibration execution module further comprise:
processing module; and
memory operably coupled to the processing module, wherein the memory stores operational instructions that cause the processing module to:
adjusting DC level of the Q component of the baseband signal in accordance with the DC offset correction indication;
producing a new first frequency spectrum component and a new second frequency spectrum component based on filtering a new digital baseband signal that represents a mixed resultant of the local oscillation with the modulated RF signal after the DC level of the Q component of the baseband signal was adjusted;
determining whether the new first frequency spectrum component represents less transmitter imbalance than that represented by the first frequency spectrum;
when the new first frequency spectrum component represents less transmitter imbalance, producing at least one updated calibration signal to fine tune the DC offset level of the Q component of the baseband signal to substantially optimize the transmitter imbalance; and
when the new first frequency spectrum component does not represent less transmitter imbalance, producing at least one updated calibration signal to coarsely adjust the DC offset level of the Q component of the baseband signal.

8. The transmitter of claim 3, wherein the filter module further comprises:
first bandpass filter operably coupled to pass a signal component of the digital baseband signal as the first frequency spectrum component; and
second bandpass filter operably coupled to pass a corresponding negative signal component of the digital baseband signal as the second frequency spectrum component, wherein the calibration signal represents a gain correction indication.

9. The transmitter of claim 8, wherein the calibration determination module and calibration execution module further comprise:
processing module; and
memory operably coupled to the processing module, wherein the memory stores operational instructions that cause the processing module to:
adjusting gain of the I component of the baseband signal in accordance with the gain correction indication;
producing a new first frequency spectrum component and a new second frequency spectrum component based on filtering a new digital baseband signal that represents a mixed resultant of the local oscillation with the modulated RF signal after the gain of the I component of the baseband signal was adjusted;

determining whether the new first frequency spectrum component represents less transmitter imbalance than that represented by the first frequency spectrum;

when the new first frequency spectrum component represents less transmitter imbalance, producing at least one updated calibration signal to fine tune the gain of the I component of the baseband signal to substantially optimize the transmitter imbalance; and when the new first frequency spectrum component does not represent less transmitter imbalance, producing at least one updated calibration signal to coarsely adjust the gain of the I component of the baseband signal.

10. The transmitter of claim 9, wherein the memory further comprises operational instructions that cause the processing module to:

provide a first set of coefficients to the filter module such that a portion of the filter module forms the first bandpass filter; and provide a second set of coefficients to the filter module such that another portion of the filter module forms the second bandpass filter.

11. The transmitter of claim 8, wherein the calibration determination module and calibration execution module further comprise:

processing module; and memory operably coupled to the processing module, wherein the memory stores operational instructions that cause the processing module to:

adjusting gain of the Q component of the baseband signal in accordance with the gain correction indication;

producing a new first frequency spectrum component and a new second frequency spectrum component based on filtering a new digital baseband signal that represents a mixed resultant of the local oscillation with the modulated RF signal after the gain of the Q component of the baseband signal was adjusted;

determining whether the new first frequency spectrum component represents less transmitter imbalance than that represented by the first frequency spectrum;

when the new first frequency spectrum component represents less transmitter imbalance, producing at least one updated calibration signal to fine tune the gain of the Q component of the baseband signal to substantially optimize the transmitter imbalance; and when the new first frequency spectrum component does not represent less transmitter imbalance, producing at least one updated calibration signal to coarsely adjust the gain of the Q component of the baseband signal.

12. The transmitter of claim 1, wherein each of the I and Q component DC offset modules further comprises:

adder operably coupled to add a DC offset to the I or Q component of the baseband signal, respectively, based on the calibration signal.

13. The transmitter of claim 1, wherein each of the I and Q component DC offset modules further comprises:

multiplier operably coupled to multiple a DC offset to the I or Q component of the baseband signal, respectively, based on the calibration signal.

14. A method for a self-calibrating direct conversion transmitter, the method comprises:

mixing an I component of a baseband signal with an I component of a local oscillation to produce a mixed I signal;

mixing a Q component of the baseband signal with a Q component of the local oscillation to produce a mixed Q signal;

summing the mixed I signal with the mixed Q signal to produce a modulated radio frequency (RF) signal;

producing a calibration signal based on an interpretation of the local oscillation and the modulated RF signal by:

mixing the modulated RF signal with the local oscillation to produce a baseband representation of the modulated RF signal;

converting the baseband representation of the modulated RF signal into a digital baseband signal;

filtering the digital baseband signal to produce a first frequency spectrum component and a second frequency spectrum component; and interpreting the first and second frequency spectrum components to produce the calibration signal; and calibrating at least one of: DC level of the I component of the baseband signal, DC level of the Q component of the baseband signal, gain of the I component of the baseband signal, and gain of the Q component of the baseband signal based on the calibration signal such that the imbalance within the transmitter is reduced.

15. The method of claim 14, wherein the filtering further comprises:

low pass filtering the digital baseband signal to pass a local oscillator leakage component of the digital baseband signal as the first frequency spectrum component; and bandpass filtering the digital baseband signal to pass a signal component of the digital baseband signal as the second frequency spectrum component, wherein the calibration signal represents a DC offset correction indication.

16. The method of claim 15, wherein the producing the calibration signal and corresponding calibrating further comprise:

adjusting DC level of the I component of the baseband signal in accordance with the DC offset correction indication;

producing a new first frequency spectrum component and a new second frequency spectrum component based on filtering a new digital baseband signal that represents a mixed resultant of the local oscillation with the modulated RF signal after the DC level of the I component of the baseband signal was adjusted;

determining whether the new first frequency spectrum component represents less transmitter imbalance than that represented by the first frequency spectrum;

when the new first frequency spectrum component represents less transmitter imbalance, producing at least one updated calibration signal to fine tune the DC offset level of the I component of the baseband signal to substantially optimize the transmitter imbalance; and when the new first frequency spectrum component does not represent less transmitter imbalance, producing at least one updated calibration signal to coarsely adjust the DC offset level of the I component of the baseband signal.

17. The method of claim 16 further comprises:

providing a first set of coefficients to the filter module such that a portion of the filter module forms the low pass filter; and providing a second set of coefficients to the filter module such that another portion of the filter module forms the bandpass filter.

18. The method of claim 15, wherein the producing the calibration signal and corresponding calibrating further comprise:

adjusting DC level of the Q component of the baseband signal in accordance with the DC offset correction indication;

producing a new first frequency spectrum component and a new second frequency spectrum component based on filtering a new digital baseband signal that represents a mixed resultant of the local oscillation with the modulated RF signal after the DC level of the Q component of the baseband signal was adjusted;

determining whether the new first frequency spectrum component represents less transmitter imbalance than that represented by the first frequency spectrum;

when the new first frequency spectrum component represents less transmitter imbalance, producing at least one updated calibration signal to fine tune the DC offset level of the Q component of the baseband signal to substantially optimize the transmitter imbalance; and when the new first frequency spectrum component does not represent less transmitter imbalance, producing at least one updated calibration signal to coarsely adjust the DC offset level of the Q component of the baseband signal.

19. The method of claim 14, wherein the filtering further comprises:

bandpass filtering the digital baseband signal to pass a signal component of the digital baseband signal as the first frequency spectrum component; and bandpass filtering the digital baseband signal to pass a corresponding negative signal component of the digital baseband signal as the second frequency spectrum component, wherein the calibration signal represents a gain correction indication.

20. The method of claim 19, wherein the producing the calibration signal and corresponding calibrating further comprise:

adjusting gain of the I component of the baseband signal in accordance with the gain correction indication;

producing a new first frequency spectrum component and a new second frequency spectrum component based on filtering a new digital baseband signal that represents a mixed resultant of the local oscillation with the modulated RF signal after the gain of the I component of the baseband signal was adjusted;

determining whether the new first frequency spectrum component represents less transmitter imbalance than that represented by the first frequency spectrum;

when the new first frequency spectrum component represents less transmitter imbalance, producing at least one updated calibration signal to fine tune the gain of the I component of the baseband signal to substantially optimize the transmitter imbalance; and when the new first frequency spectrum component does not represent less transmitter imbalance, producing at least one updated calibration signal to coarsely adjust the gain of the I component of the baseband signal.

21. The method of claim 20 further comprises:

providing a first set of coefficients to the filter module such that a portion of the filter module forms the first bandpass filter; and providing a second set of coefficients to the filter module such that another portion of the filter module forms the second bandpass filter.

22. The method of claim 19, wherein the producing the calibration signal and corresponding calibrating further comprise:

adjusting gain of the Q component of the baseband signal in accordance with the gain correction indication;

producing a new first frequency spectrum component and a new second frequency spectrum component based on filtering a new digital baseband signal that represents a mixed resultant of the local oscillation with the modulated RF signal after the gain of the Q component of the baseband signal was adjusted;

determining whether the new first frequency spectrum component represents less transmitter imbalance than that represented by the first frequency spectrum;

when the new first frequency spectrum component represents less transmitter imbalance, producing at least one updated calibration signal to fine tune the gain of the Q component of the baseband signal to substantially optimize the transmitter imbalance; and when the new first frequency spectrum component does not represent less transmitter imbalance, producing at least one updated calibration signal to coarsely adjust the gain of the Q component of the baseband signal.

23. A self-calibrating direct conversion transmitter, the transmitter comprises:

processing module; and memory operably coupled to the processing module, wherein the memory includes operational instructions that cause the processing module to:

mix an I component of a baseband signal with an I component of a local oscillation to produce a mixed I signal mix a Q component of the baseband signal with a Q component of the local oscillation to produce a mixed Q signal;

sum the mixed I signal with the mixed Q signal to produce a modulated radio frequency (Rf) signal;

produce a calibration signal based on an interpretation of the local oscillation and the modulated Rf signal by:

mixing the modulated Rf signal with the local oscillation to produce a baseband representation of the modulated RF signal;

converting the baseband representation of the modulated RE signal into a digital baseband signal;

filtering the digital baseband signal to produce a first frequency spectrum component and a second frequency spectrum component; and interpreting the first and second frequency spectrum components to produce the calibration signal; and calibrate at least one of: DC level of the I component of the baseband signal, DC level of the Q component of the baseband signal, gain of the I component of the baseband signal, and gain of the Q component of the baseband signal based on the calibration signal such that the imbalance within the transmitter is reduced.

24. The transmitter of claim 23, wherein the memory further comprises operational instructions that cause the processing module to filter the digital baseband signal by:

low pass filtering the digital baseband signal to pass a local oscillator leakage component of the digital baseband signal as the first frequency spectrum component; and bandpass filtering the digital baseband signal to pass a signal component of the digital baseband signal as the second frequency spectrum component, wherein the calibration signal represents a DC offset correction indication.

25. The transmitter of claim 24, wherein the memory further comprises operational instructions that cause the processing module to produce the calibration signal and corresponding calibration by:
adjusting DC level of the I component of the baseband signal in accordance with the DC offset correction indication;
producing a new first frequency spectrum component and a new second frequency spectrum component based on filtering a new digital baseband signal that represents a mixed resultant of the local oscillation with the modulated RF signal after the DC level of the I component of the baseband signal was adjusted;
determining whether the new first frequency spectrum component represents less transmitter imbalance than that represented by the first frequency spectrum;
when the new first frequency spectrum component represents less transmitter imbalance, producing at least one updated calibration signal to fine tune the DC offset level of the I component of the baseband signal to substantially optimize the transmitter imbalance; and
when the new first frequency spectrum component does not represent less transmitter imbalance, producing at least one updated calibration signal to coarsely adjust the DC offset level of the I component of the baseband signal.

26. The transmitter of claim 25, wherein the memory further comprises operational instructions that cause the processing module to:
provide a first set of coefficients to the filter module such that a portion of the filter module forms the low pass filter; and
provide a second set of coefficients to the filter module such that another portion of the filter module forms the bandpass filter.

27. The transmitter of claim 24, wherein the memory further comprises operational instructions that cause the processing module to produce the calibration signal and corresponding calibration by:
adjusting DC level of the Q component of the baseband signal in accordance with the DC offset correction indication;
producing a new first frequency spectrum component and a new second frequency spectrum component based on filtering a new digital baseband signal that represents a mixed resultant of the local oscillation with the modulated RF signal after the DC level of the Q component of the baseband signal was adjusted;
determining whether the new first frequency spectrum component represents less transmitter imbalance than that represented by the first frequency spectrum;
when the new first frequency spectrum component represents less transmitter imbalance, producing at least one updated calibration signal to fine tune the DC offset level of the Q component of the baseband signal to substantially optimize the transmitter imbalance; and
when the new first frequency spectrum component does not represent less transmitter imbalance, producing at least one updated calibration signal to coarsely adjust the DC offset level of the Q component of the baseband signal.

28. The transmitter of claim 23, wherein the memory further comprises operational instructions that cause the processing module to filter the digital baseband signal by:
bandpass filtering the digital baseband signal to pass a signal component of the digital baseband signal as the first frequency spectrum component; and
bandpass filtering the digital baseband signal to pass a corresponding negative signal component of the digital baseband signal as the second frequency spectrum component, wherein the calibration signal represents a gain correction indication.

29. The transmitter of claim 28, wherein the memory further comprises operational instructions that cause the processing module to produce the calibration signal and corresponding calibration by:
adjusting gain of the I component of the baseband signal in accordance with the gain correction indication;
producing a new first frequency spectrum component and a new second frequency spectrum component based on filtering a new digital baseband signal that represents a mixed resultant of the local oscillation with the modulated RF signal after the gain of the I component of the baseband signal was adjusted;
determining whether the new first frequency spectrum component represents less transmitter imbalance than that represented by the first frequency spectrum;
when the new first frequency spectrum component represents less transmitter imbalance, producing at least one updated calibration signal to fine tune the gain of the I component of the baseband signal to substantially optimize the transmitter imbalance; and
when the new first frequency spectrum component does not represent less transmitter imbalance, producing at least one updated calibration signal to coarsely adjust the gain of the I component of the baseband signal.

30. The transmitter of claim 29, wherein the memory further comprises operational instructions that cause the processing module to:
provide a first set of coefficients to the filter module such that a portion of the filter module forms the first bandpass filter; and
provide a second set of coefficients to the filter module such that another portion of the filter module forms the second bandpass filter.

31. The transmitter of claim 28, wherein the memory further comprises operational instructions that cause the processing module to produce the calibration signal and corresponding calibration by:
adjusting gain of the Q component of the baseband signal in accordance with the gain correction indication;
producing a new first frequency spectrum component and a new second frequency spectrum component based on filtering a new digital baseband signal that represents a mixed resultant of the local oscillation with the modulated RF signal after the gain of the Q component of the baseband signal was adjusted;
determining whether the new first frequency spectrum component represents less transmitter imbalance than that represented by the first frequency spectrum;
when the new first frequency spectrum component represents less transmitter imbalance, producing at least one updated calibration signal to fine tune the gain of the Q component of the baseband signal to substantially optimize the transmitter imbalance; and
when the new first frequency spectrum component does not represent less transmitter imbalance, producing at least one updated calibration signal to coarsely adjust the gain of the Q component of the baseband signal.

* * * * *

UNITED STATES PATENT AND TRADEMARK OFFICE
CERTIFICATE OF CORRECTION

| | | |
|---|---|---|
| PATENT NO. | : 7,110,469 B2 | Page 1 of 1 |
| APPLICATION NO. | : 10/094587 | |
| DATED | : September 19, 2006 | |
| INVENTOR(S) | : Hong Shi et al. | |

It is certified that error appears in the above-identified patent and that said Letters Patent is hereby corrected as shown below:

Column 9, line 7: replace "digital-to-analog" with --analog-to-digital--.

Column 20, line 40, in Claim 23: replace "(Rf)" with --(RF)--.

Column 20, line 42, in Claim 23: replace "Rf" with --RF--.

Column 20, line 43, in Claim 23: replace "Rf" with --RF--.

Column 20, line 47, in Claim 23: replace "RE" with --RF--.

Signed and Sealed this

Seventeenth Day of March, 2009

JOHN DOLL
*Acting Director of the United States Patent and Trademark Office*